May 13, 1930.  T. KELSEY  1,758,839
PLANT SUPPORT
Filed Aug. 7, 1929
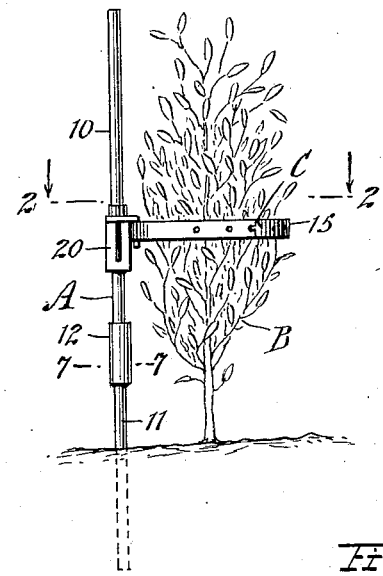
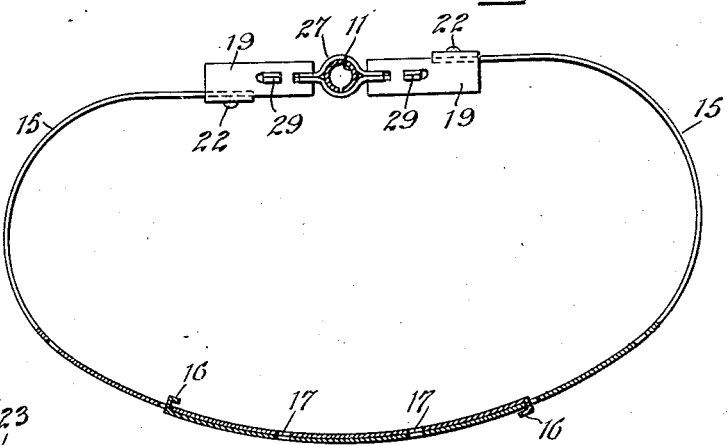
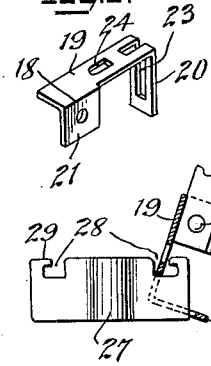
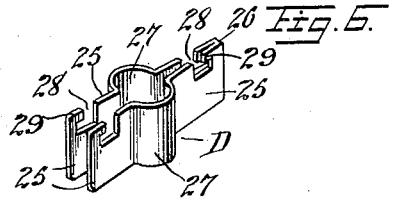
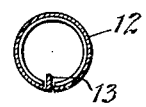
WITNESSES
H. T. Walker
Hugh H. Ott
INVENTOR
Theodore Kelsey
BY
ATTORNEYS Patented May 13, 1930

1,758,839

UNITED STATES PATENT OFFICE

THEODORE KELSEY, OF BROOKLYN, NEW YORK

PLANT SUPPORT

Application filed August 7, 1929. Serial No. 384,182.

This invention relates to supporting devices, and has particular reference to an improved device for supporting growing plants.

The invention primarily comprehends a plant supporting device which includes a post adapted to be driven into the ground and disposed in an upright position alongside of the plant to be supported, together with a girdle for embracing the plant.

The invention furthermore contemplates in a plant supporting device, a plant embracing girdle which is adjustable vertically on the post and which is circumferentially adjustable in order to compensate for the growth of the plant.

As a still further object, the invention embodies in a plant supporting device of the character set forth, the elements of which are correlated or interconnected in such a manner as to permit of the separation and collapsing of the device whereby it will occupy a minimum amount of space for storage and transportation.

Other objects of the invention reside in the simplicity of construction and mode of use of the device, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a side view of the supporting device in active use for supporting a plant.

Figure 2 is an enlarged horizontal sectional view of the supporting device taken approximately on the line indicated at 2—2 in Figure 1.

Figure 3 is a fragmentary front view of the device, parts being shown in section to disclose the underlying structure.

Figure 4 is a fragmentary detail view illustrating the manner in which the girdle is connected with or disconnected from the clamp.

Figure 5 is a detail perspective view of one of the girdle terminal elements.

Figure 6 is a similar view of the clamp with the girdle detached therefrom.

Figure 7 is an enlarged cross sectional view through the joint of the post sections, taken approximately on the line indicated at 7—7 of Figure 1.

Referring to the drawings by characters of reference, A designates generally the post which is adapted to be driven into the ground alongside of the plant B which is to be supported by the device, and C designates generally the girdle which is adapted to embrace the plant for supporting the same. The post A may include a plurality of sections 10 and 11 which are preferably of split tubular formation and adapted to be telescopically associated with each other, whereby the length of the post may be increased or decreased in accordance with the height of the plant to be supported. In practice, the lowermost section or sections of the post will be provided with an upper expanded terminal 12, the internal diameter of which approximates the external diameter of the lower end of the next adjacent upper post section whereby said sections may be interfitted. Preferably, the enlarged or expanded terminal will be formed with an inwardly directed flange or key 13 to extend into the longitudinal slot of the next adjacent upper section, to effect a more rigid connection at the juncture of the post sections.

The girdle C is composed of a plurality of sections or strips of flexible material 15 which are provided with hooked extremities 16 and with longitudinally spaced apertures 17, whereby the hooked extremities 16 of each girdle section may be selectively engaged within apertures 17 of the other girdle sections in order to increase or decrease the diameter of the girdle in accordance with the size or girth of the plant to be supported. The opposite extremities of the girdle sections 15 are secured to terminal elements 18 which are preferably fashioned from a single piece of material to provide an upper horizontal flange 19, a depending vertical flange 20 at one end of the horizontal leaf and a depending vertical ear 21 at the side edge of the opposite end of the horizontal leaf. In practice, one extremity of each band section 15 is riveted or otherwise secured as at 22 to the depending ear 21 of the terminal element. The terminal element is slotted at 23 and said slot extends partially into the horizontal and vertical flanges 19 and 20. In addition to the slot 23, an opening 24 is provided in the upper horizontal leaf 19 of the terminal element at a point slightly spaced from the slot 23.

In order to provide means for adjustably and detachably connecting the girdle C with the post A, a clamp is provided which is designated generally by the reference character D. The clamp is preferably fashioned from a single length of resilient material which is bent intermediate its ends to provide substantially rectangular leaves 25 joined at one end by a bight 26. The leaves 25 are provided intermediate their ends with substantially semi-cylindrical offsets 27 of an appropriate size to receive and frictionally grip the post A when the leaves are disposed in contiguous parallel relation to each other. The upper edges of the leaves on opposite sides of the intermediate offset portions 27 are formed with registering bayonet slots 28.

In practice, the clamp D is arranged on the post A, after which the girdle terminal elements are associated with the clamp by engaging the slots 23 over the leaves in the manner illustrated in Figure 4. The terminal elements are disposed at an angle to the clamp during the engagement of the slotted portions 23 over the opposite end of the clamp leaves 25 and as the flanged ends of the elements reach the proximity of the offset portions 27, the elements are swung downwardly to a substantially horizontal position so that the openings 24 engage over the hooked extremities 29 produced by the bayonet slots 28. Obviously, this effectually connects the free terminals of the girdle with the clamp while the terminal elements serve to effect a clamping action of the offset portions 27 with the post A. To disengage the terminals, it is obvious that the operation heretofore described is reversed, which permits of the straightening out of the girdle and disconnection of the sections thereof so that the complete device may be encompassed in a minimum amount of space for storage and transportation. It is obvious that in a device of the character set forth, one or more girdles may be employed in connection with a single post and that the girdles may be vertically adjusted on the post to compensate for the growth of the plant while additional post sections may be added to compensate for the increase in the height of the plant. The increase in the girth of the plant may be compensated for by enlarging the girdle, and in extreme cases, an intermediate girdle section may be used which, obviously, would be provided with apertures in which the hooked terminals 16 would engage.

From the foregoing, it will thus be seen that a plant supporting device has been devised which is constructed in such a manner as to afford a wide range of adjustment to compensate for increase in the height or girth of a plant to be supported.

What is claimed is:

1. In a plant supporting device, a post adapted to be driven into the ground alongside of a plant, a plant embracing girdle, a clamp for supporting the girdle from the post and interengageable means provided respectively on the girdle terminals and the clamp serving as a common means for detachably connecting the girdle with the clamp and for frictionally maintaining the clamp on the post.

2. In a plant supporting device, a post adapted to be driven into the ground alongside of a plant, a plant embracing girdle, a clamp for supporting the girdle from the post and interengageable means provided respectively on the girdle terminals and the clamp serving as a common means for detachably connecting the girdle with the clamp and for frictionally maintaining the clamp on the post, said interengageable means of connection including slotted girdle terminals and bayonet slotted portions of the clamp.

3. In a plant supporting device, a post adapted to be driven into the ground alongside of a plant, a plant embracing girdle, a clamp longitudinally adjustable on the post and interengageable means of connection between the clamp and girdle terminals for detachably connecting the girdle with the clamp and for frictionally maintaining the clamp on the post.

4. In a plant supporting device, a post adapted to be driven into the ground alongside of a plant, a plant embracing girdle, a clamp longitudinally adjustable on the post and interengageable means of connection between the clamp and girdle terminals for detachably connecting the girdle with the clamp and for frictionally maintaining the clamp on the post, said clamp including a pair of leaves joined at one end and provided with intermediate oppositely offset substantially semi-cylindrical portions, the free end of which clamp leaves is adapted to be engaged by the interengageable means for connecting the girdle therewith whereby to maintain the clamp in frictional clamping relation with the post.

Signed at New York, in the county of New York and State of New York, this 6th day of August A. D. 1929.

THEODORE KELSEY.